United States Patent
Kim et al.

(10) Patent No.: US 10,990,536 B2
(45) Date of Patent: Apr. 27, 2021

(54) MEMORY CONTROLLER, OPERATING METHOD OF THE MEMORY CONTROLLER, AND STORAGE DEVICE INCLUDING THE MEMORY CONTROLLER

(71) Applicant: Samsung Electronics Co., Ltd., Suwon-si (KR)

(72) Inventors: Jung-Hoon Kim, Yongin-si (KR); Young-Sik Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/506,308

(22) Filed: Jul. 9, 2019

(65) Prior Publication Data

US 2020/0089618 A1  Mar. 19, 2020

(30) Foreign Application Priority Data

Sep. 17, 2018 (KR) .................... 10-2018-0111026

(51) Int. Cl.
 *G06F 12/1009* (2016.01)
(52) U.S. Cl.
 CPC .... *G06F 12/1009* (2013.01); *G06F 2212/657* (2013.01)
(58) Field of Classification Search
 None
 See application file for complete search history.

(56) References Cited

U.S. PATENT DOCUMENTS

| 5,526,504 | A | 6/1996 | Hsu et al. |
| 8,675,408 | B2 | 3/2014 | Kim |
| 8,762,661 | B2 * | 6/2014 | Ng ........................ G06F 3/0617 711/154 |
| 8,819,375 | B1 * | 8/2014 | Pruett ..................... G06F 13/28 707/693 |
| 8,832,382 | B2 | 9/2014 | Mayhew et al. |
| 8,949,568 | B2 | 2/2015 | Wei et al. |
| 9,170,933 | B2 | 10/2015 | Cideciyan et al. |

(Continued)

FOREIGN PATENT DOCUMENTS

CN       106293521 A      1/2017

OTHER PUBLICATIONS

Subpage-based Flash Translation Layer for Solid State Drivers, KAIST, 2016 (Kang, Minchelo et al.) ,https://koasas.kaist.ac.kr/handle/10203/221862>.

*Primary Examiner* — Elias Mamo
(74) *Attorney, Agent, or Firm* — Harness, Dickey & Pierce, P.L.C.

(57) ABSTRACT

A memory controller, an operating method of the memory controller, and a storage device including the memory controller are disclosed. The memory controller includes: a memory configured to store an address mapping table and a segment mapping table; and a mapping data management module configured to select at least two updated segments among a plurality of segments included in the address mapping table as page data to be stored in one page of a nonvolatile memory, wherein each of the plurality of segments includes a plurality of mapping entries representing mapping information between logical addresses and physical addresses, and wherein the segment mapping table includes physical addresses representing areas in which each of the plurality of segments is stored in the nonvolatile memory.

18 Claims, 16 Drawing Sheets

(56) References Cited

U.S. PATENT DOCUMENTS

| | | | |
|---|---|---|---|
| 9,507,711 B1 | 11/2016 | Kotte et al. | |
| 9,766,974 B2* | 9/2017 | Hsiao | G06F 11/1068 |
| 10,482,029 B1* | 11/2019 | Chanler | G06F 3/0619 |
| 2010/0306451 A1 | 12/2010 | Johnson | |
| 2013/0024604 A1* | 1/2013 | Yeh | G06F 12/0246 |
| | | | 711/103 |
| 2015/0154071 A1 | 6/2015 | Hsiao et al. | |
| 2017/0024326 A1 | 1/2017 | Luo et al. | |
| 2017/0235636 A1* | 8/2017 | Zhou | G06F 3/06 |
| | | | 714/764 |
| 2018/0129599 A1 | 5/2018 | Kim | |
| 2019/0220416 A1* | 7/2019 | Jung | G06F 12/1009 |
| 2019/0243775 A1* | 8/2019 | Kim | G06F 12/0246 |
| 2020/0057725 A1* | 2/2020 | Cho | G06F 12/0246 |

\* cited by examiner

FIG. 2B

| SEGMENT | PA | |
|---|---|---|
| | PN | OFFSET |
| SG0 | PPN_b0 | OFF_0 |
| SG1 | PPN_b0 | OFF_1 |
| SG2 | PPN_b0 | OFF_2 |
| SG3 | PPN_b0 | OFF_3 |
| SG4 | PPN_c0 | OFF_4 |
| SG5 | PPN_c0 | OFF_5 |
| ⋮ | ⋮ | ⋮ |
| SGn-1 | PPN_d0 | OFF_3 |

SMT

PAGE (spans SG0–SG3)

FIG. 4B

SMTb

| SEGMENT | PA | |
|---|---|---|
| | PN | OFFSET |
| SG0 | PPN_b0 | OFF_0 |
| SG1 | PPN_g0 | OFF_0 |
| SG2 | PPN_b0 | OFF_2 |
| SG3 | PPN_b0 | OFF_3 |
| SG4 | PPN_c0 | OFF_0 |
| SG5 | PPN_g0 | OFF_1 |
| SG6 | PPN_c0 | OFF_2 |
| SG7 | PPN_c0 | OFF_3 |
| ... | ... | ... |
| SGa | PPN_g0 | OFF_2 |
| ... | ... | ... |
| SGb | PPN_g0 | OFF_3 |
| ... | ... | ... |
| SGn−1 | PPN_f0 | SGn−1 |

↑ Update

SMTa

| SEGMENT | PA | |
|---|---|---|
| | PN | OFFSET |
| SG0 | PPN_b0 | OFF_0 |
| SG1 | PPN_b0 | OFF_1 |
| SG2 | PPN_b0 | OFF_2 |
| SG3 | PPN_b0 | OFF_3 |
| SG4 | PPN_c0 | OFF_0 |
| SG5 | PPN_c0 | OFF_1 |
| SG6 | PPN_c0 | OFF_2 |
| SG7 | PPN_c0 | OFF_3 |
| ... | ... | ... |
| SGa | PPN_d0 | OFF_1 |
| ... | ... | ... |
| SGb | PPN_e0 | OFF_2 |
| ... | ... | ... |
| SGn−1 | PPN_f0 | SGn−1 |

MEMORY CONTROLLER, OPERATING METHOD OF THE MEMORY CONTROLLER, AND STORAGE DEVICE INCLUDING THE MEMORY CONTROLLER

CROSS-REFERENCE TO RELATED APPLICATION

This application claims the benefit of Korean Patent Application No. 10-2018-0111026, filed on Sep. 17, 2018, in the Korean Intellectual Property Office, the disclosure of which is incorporated herein in its entirety by reference.

BACKGROUND

Example embodiments of the inventive concepts relate to a semiconductor device. For example, at least some example embodiments relate to a memory controller, an operating method of the memory controller, and/or a storage device including the memory controller.

As a nonvolatile memory, a flash memory may retain the stored data even when the power is turned off. Recently, storage devices including nonvolatile memory such as embedded Multi-Media Card (eMMC), Universal Flash Storage (UFS), Solid State Drive (SSD), NAND flash storage, and a memory card have been widely used. Since nonvolatile memory cannot be overwritten, when data corresponding to a logical address is to be updated, the storage device may write updated data in a writable area of the nonvolatile memory other than the existing area in which data has been written within the nonvolatile memory, and may update mapping information including the physical address and the logical address where the actual data has been written. On the other hand, the mapping information may also be stored in the nonvolatile memory for permanent preservation.

SUMMARY

Example embodiments of the inventive concepts provide a memory controller capable of efficiently storing updated mapping information in a nonvolatile memory, an operating method of the memory controller, and/or a storage device including the memory controller.

According to an example embodiment of the inventive concepts, there is provided a memory controller including a memory configured to store an address mapping table and a segment mapping table, the segment mapping table including physical addresses representing areas in which each of a plurality of segments are stored in a nonvolatile memory; and processing circuitry configured to select at least two updated segments among the plurality of segments included in the address mapping table as page data to store in one page of the nonvolatile memory, each of the plurality of segments including a plurality of mapping entries representing mapping information between logical addresses and physical addresses.

According to another example embodiment of the inventive concepts, there is provided an operating method of memory controller, the operating method including selecting at least two updated segments among a plurality of segments included in an address mapping table; grouping the at least two updated segments as one page data; and instructing a nonvolatile memory to store the page data at a physical address.

According to another example embodiment of the inventive concepts, there is provided a storage device including: a nonvolatile memory; a buffer memory configured to store an address mapping table and a segment mapping table, the segment mapping table including physical addresses representing areas in which each of a plurality of segments are stored in the nonvolatile memory; and a memory controller configured to group at least two updated segments among the plurality of segments included in the address mapping table as page data to store in one page of the nonvolatile memory, and to provide the nonvolatile memory with the page data, each of the plurality of segments including a plurality of mapping entries representing mapping information between logical addresses and physical addresses.

BRIEF DESCRIPTION OF THE DRAWINGS

Example embodiments of the inventive concepts will be more clearly understood from the following detailed description taken in conjunction with the accompanying drawings in which:

FIG. 2B is a diagram illustrating a segment mapping table according to an example embodiment of the inventive concepts;

FIG. 4B illustrates a method of updating a segment mapping table, according to an example embodiment of the inventive concepts;

DETAILED DESCRIPTION

Hereinafter, example embodiments of the inventive concepts will be described in detail with reference to the accompanying drawings.

Figure 1:
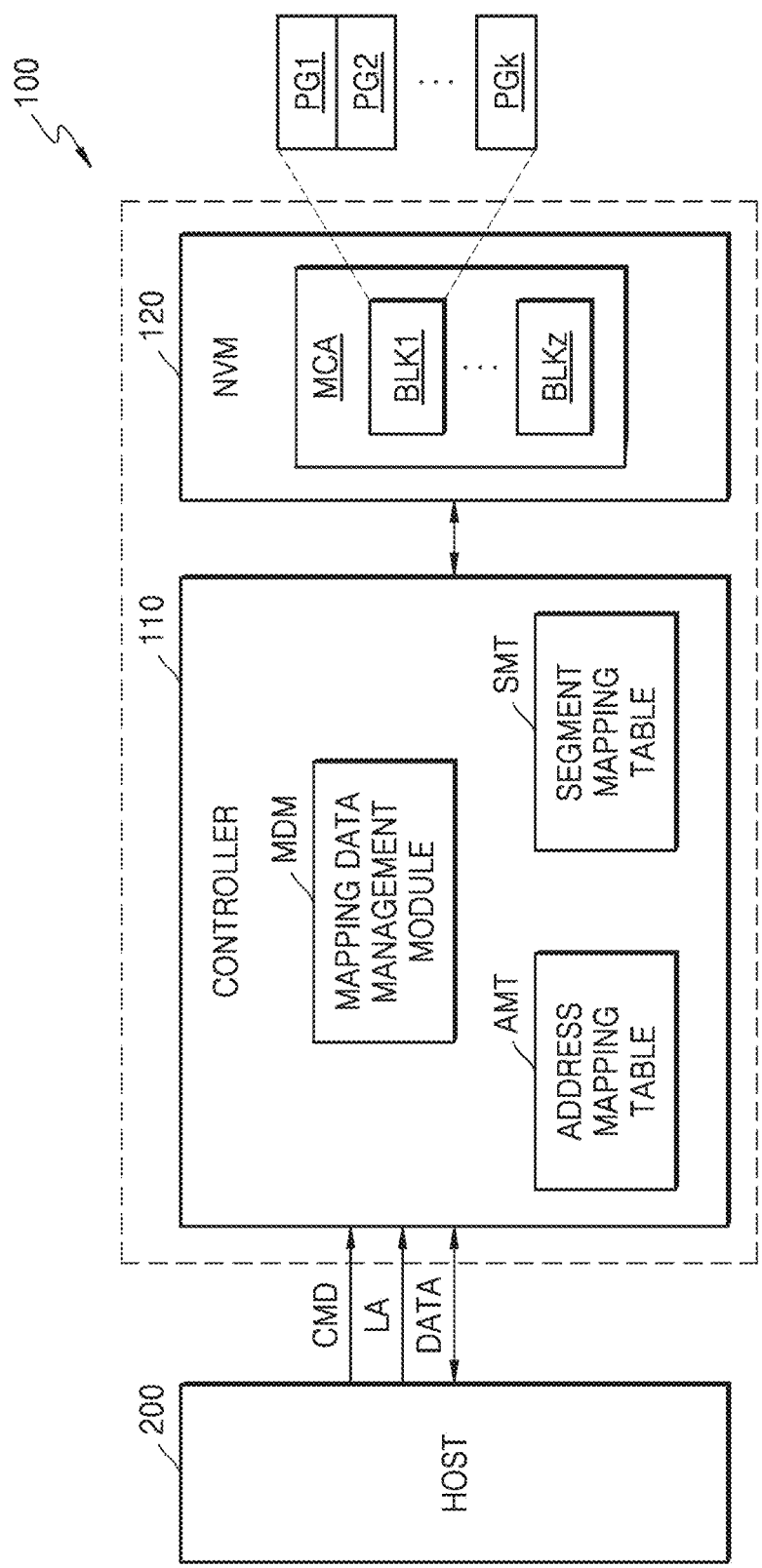
FIG. 1 is a block diagram illustrating a memory system according to an example embodiment of the inventive concepts.

FIG. 1 is a block diagram illustrating a memory system according to an example embodiment of the inventive concepts.

Referring to FIG. 1, a memory system 100 may include a controller 110 (also referred to as a memory controller) and a nonvolatile memory 120. The memory system 100 may communicate with a host 200 via various interfaces. The memory system 100 may store data DATA in the nonvolatile memory 120 or may read data DATA from the nonvolatile memory 120, in response to the read/write command CMD received from the host 200.

The host 200 may refer to a data processing device capable of processing data such as a central processing unit (CPU), a processor, a microprocessor, and an application processor (AP). The host 200 may execute an operating system (OS) and/or various applications. For example, the host 200 may be implemented as a system-on-a-chip (SoC).

When the writing of data DATA is requested, the host 200 may transmit a write command CMD, the data DATA, and a logical address LA indicating a logical area where the data DATA is to be stored, to the memory system 100. When the reading of data DATA is requested, the host 200 may transmit a reading command CMD and a logical address LA indicating a logical area where the data DATA is to be read, to the memory system 100.

The nonvolatile memory 120 may include a memory cell array MCA, the memory cell array MCA may include memory blocks BLK1 to BLKz, and each of the memory blocks BLK1 to BLKz may include a plurality of pages PG1 to PGk. Here, z and k may be positive integers, respectively, and may be variously changed according to example embodiments. For example, a memory block may be a unit of erasing, and a page may be a unit of writing and reading. In some embodiments, the memory cell array MCA may include a plurality of planes, a plurality of dies, or a plurality of chips. In an example embodiment, the nonvolatile memory 120 may include a flash memory device and may include, for example, a NAND flash memory device. However, the inventive concepts are not limited these examples, and the nonvolatile memory 120 may include resistive memory devices such as resistive RAM (ReRAM), phase change RAM (PRAM), and magnetic RAM (MRAM). Hereinafter, it is assumed that the nonvolatile memory 120 is a NAND flash memory device.

In an example embodiment, the memory cell array MCA may be a three-dimensional (3D) memory array. The 3D memory array is monolithically formed on an active area arranged on a silicon substrate and on at least one physical level of memory cell arrays having a circuit formed on the substrate or in the substrate as a circuit related with the operation of the memory cells. The term "monolithic" means that layers of each level that make up the array are stacked directly on top of the layers of each lower level of the array. In an example embodiment according to the teachings of the inventive concepts, the 3D memory array includes vertical NAND strings arranged in a vertical direction such that at least one memory cell is located above another memory cell. The at least one memory cell may include a charge trap layer.

U.S. Pat. Nos. 7,679,133, 8,553,466, 8,654,587, and 8,559,235, and U.S. Patent Application Publication No. 2011/0233648, which are incorporated herein by reference, disclose components about a 3D memory array which is formed of a plurality of levels and in which word lines and/or bit lines are shared between the levels.

The controller 110 may control the nonvolatile memory 120 to write data DATA in the memory cell array MCA in response to the write request from the host 200 or to read the data stored in the memory cell array MCA in response to the read command from the host 200. The controller 110 may convert the logical address LA received from the host 200 into a physical address PA indicating a physical area in the memory cell array MCA and then may write data DATA to an area in the memory cell array MCA indicated by the converted physical address PA or may read the data DATA from the area. The controller 110 may manage address mapping information (or an address mapping entry) indicating mapping information between the logical address LA and the physical address PA.

Referring to FIG. 1, the controller 110 may include an address mapping table AMT, a segment mapping table SMT, and a mapping data management module MDM. For example, the address mapping table AMT and the segment mapping table SMT may be loaded into a memory (e.g., a cache memory 18 of FIG. 7) in the controller 110. Referring to FIG. 1, it is illustrated that the address mapping table AMT and the segment mapping table SMT are included in the controller 110, but the inventive concepts are not limited to this example. In some example embodiments, the address mapping table AMT and the segment mapping table SMT may be loaded into a memory chip external to a controller chip on which the controller 110 is implemented, for example, a dynamic random access memory (DRAM) chip, or may be loaded into a nonvolatile memory chip.

Figure 2A:
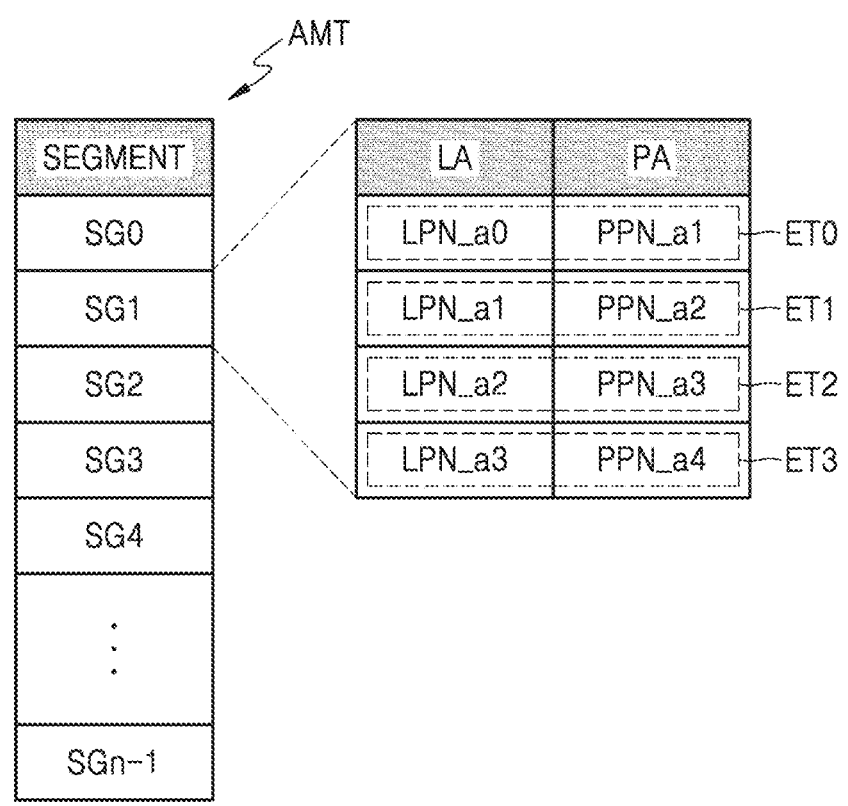
FIG. 2A is a diagram illustrating an address mapping table according to an example embodiment of the inventive concepts.

FIG. 2A is a diagram illustrating an address mapping table according to an example embodiment of the inventive concepts.

Referring to FIG. 2A, the address mapping table AMT may include a plurality of segments SG0 to SGn−1, and each of the segments SG0 to SGn−1 may include a plurality of mapping entries ET0 to ET3. In FIG. 2A, a segment (e.g., a second segment SG1) is illustrated as including four mapping entries ET0 to ET3, but the inventive concepts are not limited to this example. The number of mapping entries included in the segment may be variable.

The data sizes of the plurality of segments SG0 to SGn−1 are the same, and the data size of each of the segments may be smaller than the write unit of the memory cell array MCA, for example, the page data size. For example, assuming that the data size of the page is 16 kilobytes, the data size of the segment may be (16/2N) KB (where N is a positive integer and 2N is a positive integer of 16 or less). The data size of the plurality of segments SG0 to SGn−1 may be variable.

Each of the plurality of mapping entries ET0 to ET3 may include a logical address LA and a physical address PA assigned to the logical address LA. In an example embodiment, each of the plurality of mapping entries ET0 to ET3 may include a logical page number LPN and a physical page number PPN assigned to the logical page number LPN. For example, the first mapping entry ET0 may include a logical page number LPN_a0 and a physical page number PPN_a1 assigned thereto. As such, the scheme of mapping a physical page number to a logical page number may be referred to as a page mapping scheme.

Since the nonvolatile memory 120 is not overwritable, when the data corresponding to the logical address LA is to be updated, the controller 110 may write data DATA to be updated in an area other than the area where the data DATA has previously been written in the memory cell array MCA, for example, a valid area in an erase state, and may update the physical address PA corresponding to the logical address LA based on a new physical address PA indicating the area where the data has been actually written. That is, the controller 110 may update the mapping entry.

For example, in the state where data DATA for the logical page number LPN_a0 is stored in one area of the memory cell array MCA corresponding to the physical page number PPN_a1, when the logical page number LPN_a0 and data DATA to be written to the nonvolatile memory 120 are received together with the write command CMD from the host 200, the controller 110 may store the data DATA in the valid page of the memory cell array MCA and update the physical address PA of the first mapping entry ET0 based on the physical page number of the valid page. For example, when the physical page number of the valid page is PPN_a5, the physical address PA of the first mapping entry ET0 may be changed from the physical page number PPN_a1 to the physical page number PPN_a5.

The controller 110 may store the address mapping table AMT in the nonvolatile memory 120 for persistence of the address mapping table AMT and may load the address mapping table AMT stored in the nonvolatile memory 120 when the memory system 100 is powered on, to the memory in the controller 110 (or a DRAM chip external to the controller 110). The controller 110 may store at least some of the updated segments among the plurality of segments SG0 to SGn-1 of the address mapping table AMT in the nonvolatile memory 120, either periodically or in response to the occurrence of an event. At this time, the updated segments mean segments including at least one updated mapping entry.

FIG. 2B is a diagram illustrating a segment mapping table according to an example embodiment of the inventive concepts.

Referring to FIG. 2B, the segment mapping table SMT includes each of physical addresses PA corresponding to each of a plurality of segments SG0 to SGn-1 of the address mapping table AMT. The physical address PA indicates an area in which the segments are stored in the memory cell array MCA of the nonvolatile memory 120. The segment mapping table SMT includes segment mapping information i.e., locations in which the plurality of segments SG0 to SGn-1 are stored in the memory cell array MCA of the nonvolatile memory 120.

As described above with reference to FIG. 2A, the data size of the segments is smaller than the data size of the page, and a plurality of segments may be stored in one page of the memory cell array MCA. Accordingly, the physical address PA corresponding to each of the segments included in the segment mapping table SMT may include a physical page number and an offset. The offset represents the position in the page where the segments are stored. For example, the offset indicates how many bytes from the first byte of the page the segments are stored.

As shown in FIG. 2B, a plurality of segments, e.g., four segments, may be stored in one page. For example, when the first to fourth segments SG0 to SG3 are stored in one page, the physical page numbers of the first to fourth segments SG0 to SG3 are the same, and their offsets may be different.

As described above with reference to FIG. 2A, some segments of the plurality of segments SG0 to SGn-1 may be updated, and the updated segments may be stored in the nonvolatile memory 120. When the updated segments are stored in the nonvolatile memory 120, the physical addresses PA of the segments may be changed in the segment mapping table SMT. For example, when a second segment SG1 is updated and stored in the memory cell array MCA of the nonvolatile memory 120, the physical address PA of the second segment SG1, which indicates a physical page number PPN_b0 and an offset OFF_1, may be changed to a physical address PA indicating a physical page number where the updated segment is stored and its offset. As such, when the updated segments are stored in the nonvolatile memory 120, the physical address PA corresponding to the segments may be updated.

Meanwhile, the controller 110 may store the segment mapping table SMT in the nonvolatile memory 120 for the persistence of the segment mapping table SMT. The controller 110 may store the segment mapping table SMT in the nonvolatile memory 120, either periodically or in response to the occurrence of an event. The controller 110 may load the segment mapping table SMT stored in the nonvolatile memory 120 at the power-on time of the memory system 100 into the memory (or a DRAM chip outside the controller 110) in the controller 110. The controller 110 may load the address mapping table AMT from the nonvolatile memory 120 based on the mapping information of the segments of the segment mapping table SMT.

Referring to FIG. 1, the mapping data management module MDM may manage the address mapping table AMT and the segment mapping table SMT. The mapping data management module MDM may store updated segments of the plurality of segments SG0 to SGn-1 of the address mapping table AMT in the nonvolatile memory 120. The mapping data management module MDM may select at least two segments of the plurality of segments SG0 to SGn-1 as page data to be stored in one page of the nonvolatile memory 120. The mapping data management module MDM may update the segment mapping table SMT based on the physical address PA indicating the page in which the at least two segments are to be stored. The mapping data management module MDM may provide the nonvolatile memory 120 with a physical address PA indicating at least two selected segments and pages to be stored.

In an example embodiment, as discussed below with reference to FIG. 7, the controller 100 may include a memory and a processor, where the memory stores instructions that, when executed by the processor, configure the processor as a special purpose processor to perform the functions of the mapping data management module MDM using a flash translation layer FTL of the memory. However, the inventive concepts are not limited to this example, and the mapping data management module MDM may be implemented by hardware or a combination of hardware and software. Therefore, the processor (e.g., the mapping data management module MDM) may improve the functioning of the memory system 100 itself by reducing overhead of the nonvolatile memory 120 by reducing unnecessary writing and/or a number of writing operations.

Thus, in the memory system 100 according to an example embodiment of the inventive concepts, the controller 110 may group mapping entries of the address mapping table AMT into writing units of the memory cell array MCA, that is, segment units smaller than page units, may group at least two segments as one page data, and may write the page data to one page of the memory cell array MCA. The controller 110 may manage the physical address PA indicating the location where each of the plurality of segments included in the address mapping table AMT is stored in the memory cell array MCA by using the segment mapping table SMT, and, when the updated segment is written in the memory cell array MCA, the controller 110 may update the segment mapping table SMT based on the physical address PA indicating the written location.

As a comparative example to example embodiments of the inventive concepts, in order for a controller to manage the mapping entries of the address mapping table AMT page-by-page and store the updated mapping entries in the nonvolatile memory 120, when the mapping entries grouped in page units are written to the memory cell array MCA, a plurality of mapping entries that have not been updated may be written to the memory cell array MCA together. This may result in unnecessary writing. Further, when the mapping entries are updated at a plurality of locations of the address mapping table AMT, that is, when the mapping entries belonging to different pages are updated, in order for the updated mapping entries to be stored in the nonvolatile memory 120, a plurality of write operations may be performed, resulting in overhead in the nonvolatile memory 120.

However, as described above, in the memory system 100 according to an example embodiment of the inventive concepts, the controller 110 may manage the mapping entries in segment units smaller than pages and group updated segments including updated mapping entries as page data to thereby be written to the memory cell array MCA, thereby reducing (or, alternatively, minimizing) unnecessary writing and reducing the number of writing times. Accordingly, the overhead of the nonvolatile memory 120 may be reduced.

The memory system 100 according to example embodiments of the inventive concepts may be embedded in an electronic device or implemented as an electronic device. The electronic device may be implemented, for example, as a personal computer (PC), a data server, a network-attached storage (NAS), an Internet of Things (IoT) device, or a portable electronic device. The portable electronic device may be a laptop computer, a mobile phone, a smart phone, a tablet PC, a personal digital assistant (PDA), an enterprise digital assistant (EDA), a digital still camera, a digital video camera, a personal navigation device, an MP3 player, a handheld game console, an e-book, a wearable device, or the like.

In some example embodiments, the memory system 100 may be an internal memory that is embedded in the electronic device. For example, the memory system 100 may be an SSD, an embedded Universal Flash Storage (UFS) memory device, or an embedded Multi-Media Card (eMMC). In some example embodiments, the memory system 100 may be an external memory removable from the electronic device. For example, the memory system 100 may be a UFS memory card, a Compact Flash (CF) card, a Secure Digital (SD) card, a Micro Secure Digital (SD) card, a Mini Secure Digital (SD) card, or a memory stick.

Figure 3:
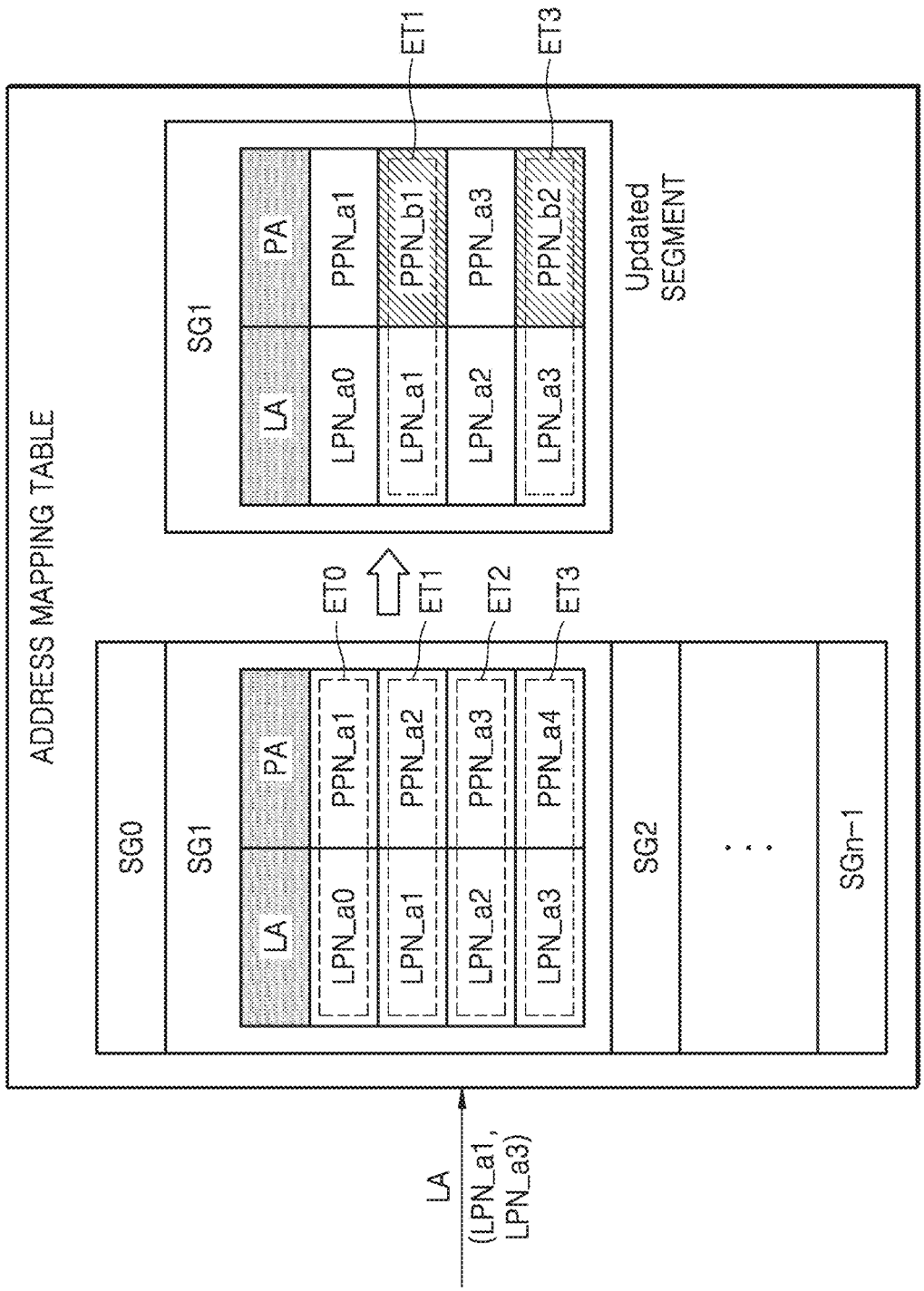
FIG. 3 is a diagram illustrating an update of an address mapping table, according to an example embodiment of the inventive concepts.

FIG. 3 is a diagram illustrating an update of an address mapping table, according to an example embodiment of the inventive concepts.

Referring to FIG. 3, the address mapping table AMT may include a plurality of segments SG0 to SGn−1, each of which includes a plurality of mapping entries including a physical address PA corresponding to its logical address LA. For example, each of the segments may include four mapping entries.

For example, the second segment SG1 may include first through fourth mapping entries ET0 through ET3. The first mapping entry ET0 may include a logical page number LPN_a0 and its corresponding physical page number PPN_a1, the second mapping entry ET1 may include a logical page number LPN_a1 and its corresponding physical page number PPN_a2, the third mapping entry ET2 may include a logical page number LPN_a2 and its corresponding physical page number PPN_a3, and the fourth mapping entry ET3 may include a logical page number LPN_a3 and its corresponding physical page number PPN_a4.

A logical address LA in which data is to be stored along with a write command from the host 200 of FIG. 1 may be received, and when logical page numbers LPN_a1 and LPN_a3 are received as the logical address LA, physical page numbers corresponding to the logical page numbers LPN_a1 and LPN_a3 may be reallocated. For example, physical page numbers PPN_b1 and PPN_b2 may be assigned to the logical page number LPN_a1 of the second mapping entry ET1 and the logical page number LPN_a3 of the fourth mapping entry ET3, respectively. The data requested to be written from the host 200 may be stored in an area corresponding to the physical page numbers PPN_b1 and PPN_b2 in the memory cell array MCA (FIG. 1) of the nonvolatile memory 120 (FIG. 1).

Meanwhile, the physical page numbers of the second mapping entry ET1 and the fourth mapping entry ET3 may be changed to PPN_b1 and PPN_b2, respectively. In other words, the second mapping entry ET1 and the fourth mapping entry ET3 may be updated. Also, the second segment SG1 includes updated mapping entries and may be determined as an updated segment. As such, the segment including at least one updated mapping entry among the plurality of segments SG0 to SGn−1 may be determined as the updated segment.

Figure 4A:
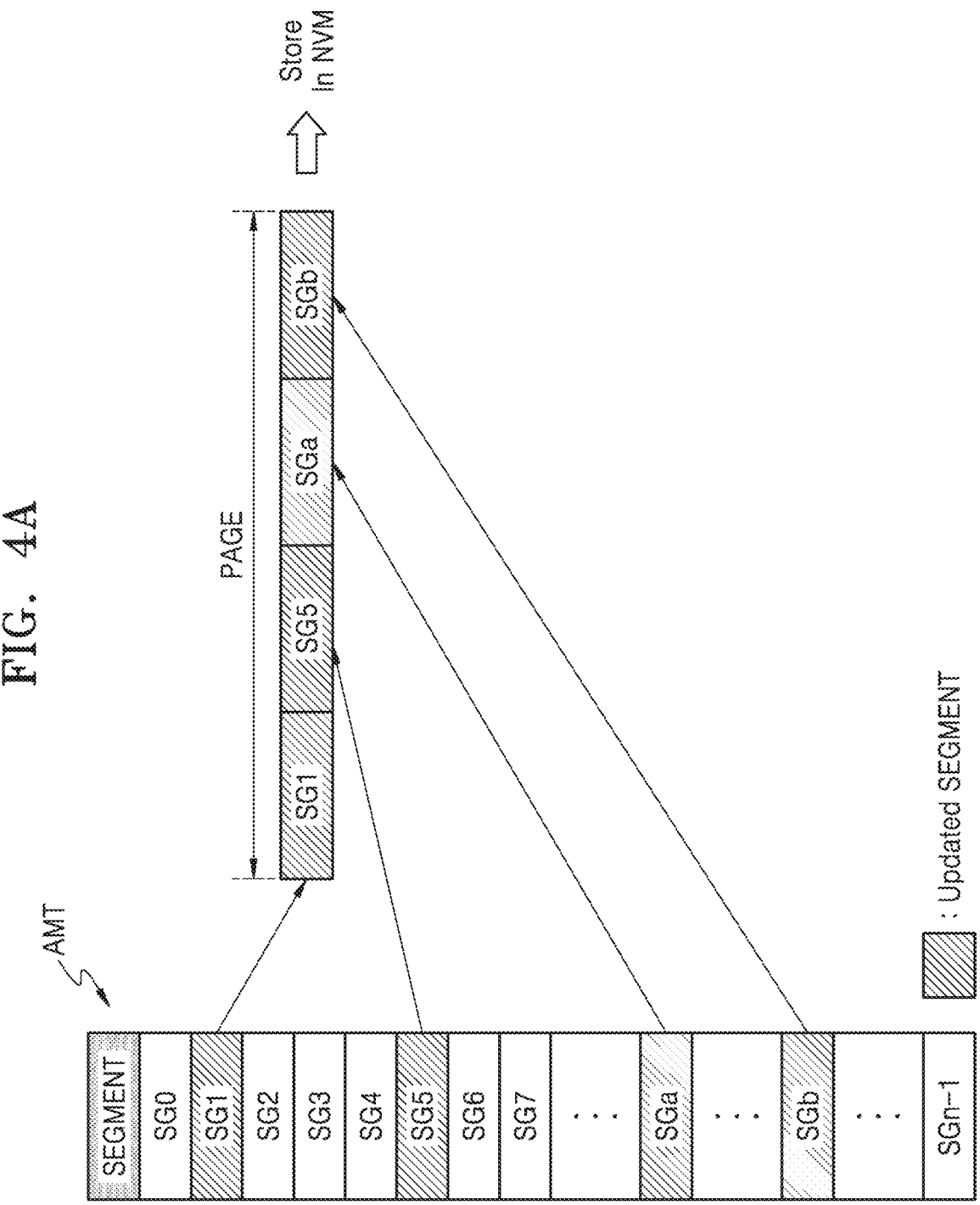
FIG. 4A illustrates a method of storing updated segments, according to an example embodiment of the inventive concepts.

FIG. 4A illustrates a method of storing updated segments, according to an example embodiment of the inventive concepts, and FIG. 4B illustrates a method of updating a segment mapping table, according to an example embodiment of the inventive concepts.

It is assumed that the data size of the plurality of segments SG0 to SGn−1 included in the address mapping table AMT is ¼ of the data size of the page, and segments SG1, SG5, SGa, and SGb among the plurality of segments SG0 to SGn−1 are updated segments.

Referring to FIGS. 1 and 4A, the mapping data management module MDM of the controller 110 may group the updated segments in page units and may store the grouped segments in the nonvolatile memory 120. As shown, the mapping data management module MDM may group the updated segments SG1, SG5, SGa, and SGb as one page data and provide the grouped page data to the nonvolatile memory 120. The nonvolatile memory 120 may write the received page data, i.e., the data included in the grouped segments SG1, SG5, SGa, and SGb, into one page of the memory cell array MCA through one write operation.

As another example, when the data size of the plurality of segments SG0 to SGn−1 is half the data size of the page, the mapping data management module MDM may group the updated segments SG1 and SG5 as one page data and may provide the grouped page data to the nonvolatile memory 120. In addition, the mapping data management module MDM may group the updated segments SGa and SGb as another page data and provide the other page data to the nonvolatile memory 120. The nonvolatile memory 120 may write the received two pieces of page data to two pages of the memory cell array MCA through two write operations.

Referring to FIGS. 1 and 4B, meanwhile, in the segment mapping table SMTa, the physical addresses PA of the updated segments SG1, SG5, SGa, and SGb stored in the memory cell array MCA may be updated, as shown in FIG. 4B. Since the updated segments SG1, SG5, SGa, and SGb are stored in the same page in the memory cell array MCA, in the segment mapping table SMTb, the physical addresses PA corresponding to the segments SG1, SG5, SGa, and SGb have the same page number, for example, PPN_g0. In addition, the physical addresses PA corresponding to the segments SG1, SG5, SGa, and SGb may include different offsets indicating locations where the segments SG1, SG5, SGa, and SGb are stored in the page corresponding to the physical page number PPN_g0, namely, OFF_0, OFF_1, OFF_2, and OFF_3.

Figure 5A:
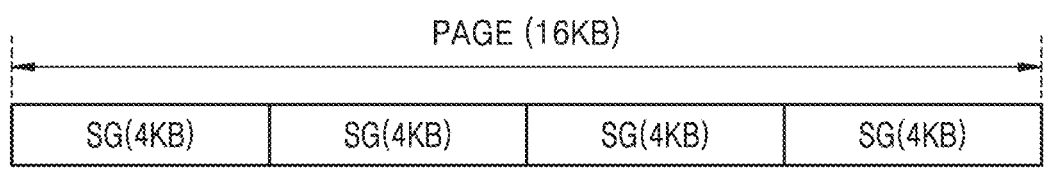
FIGS. 5A and 5B are diagrams illustrating segments having variable data sizes, according to an example embodiment of the inventive concepts.
Figure 5B:
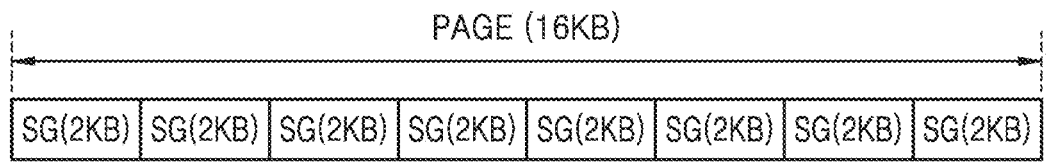

FIGS. 5A and 5B are diagrams illustrating segments having variable data sizes, according to an example embodiment of the inventive concepts.

Referring to FIGS. 5A and 5B, the data size of a segment SG may be variable. For example, as shown in FIG. 5A, the data size of the segment SG may be 4 KB. When the data size of the page is 16 KB, four segments SG may be grouped into one page so that the updated segments are stored in the nonvolatile memory 120 of FIG. 1. As another example, as shown in FIG. 5B, the data size of the segment SG may be 2 KB. When the data size of the page is 16 KB, 8 segments SG may be grouped into one page so that the updated segments are stored in the nonvolatile memory 120 of FIG. 1.

In an example embodiment, the data size of the segment SG may be set in the setup operation according to the power-on of the memory system (100 of FIG. 1). At this time, the data size of the segment SG may be variable at every setup.

In another example embodiment, the data size of segment SG may be set in the operation stage of the memory system 100, and the data size of segment SG may be variable in the process of operation of the memory system 100.

Figure 6:
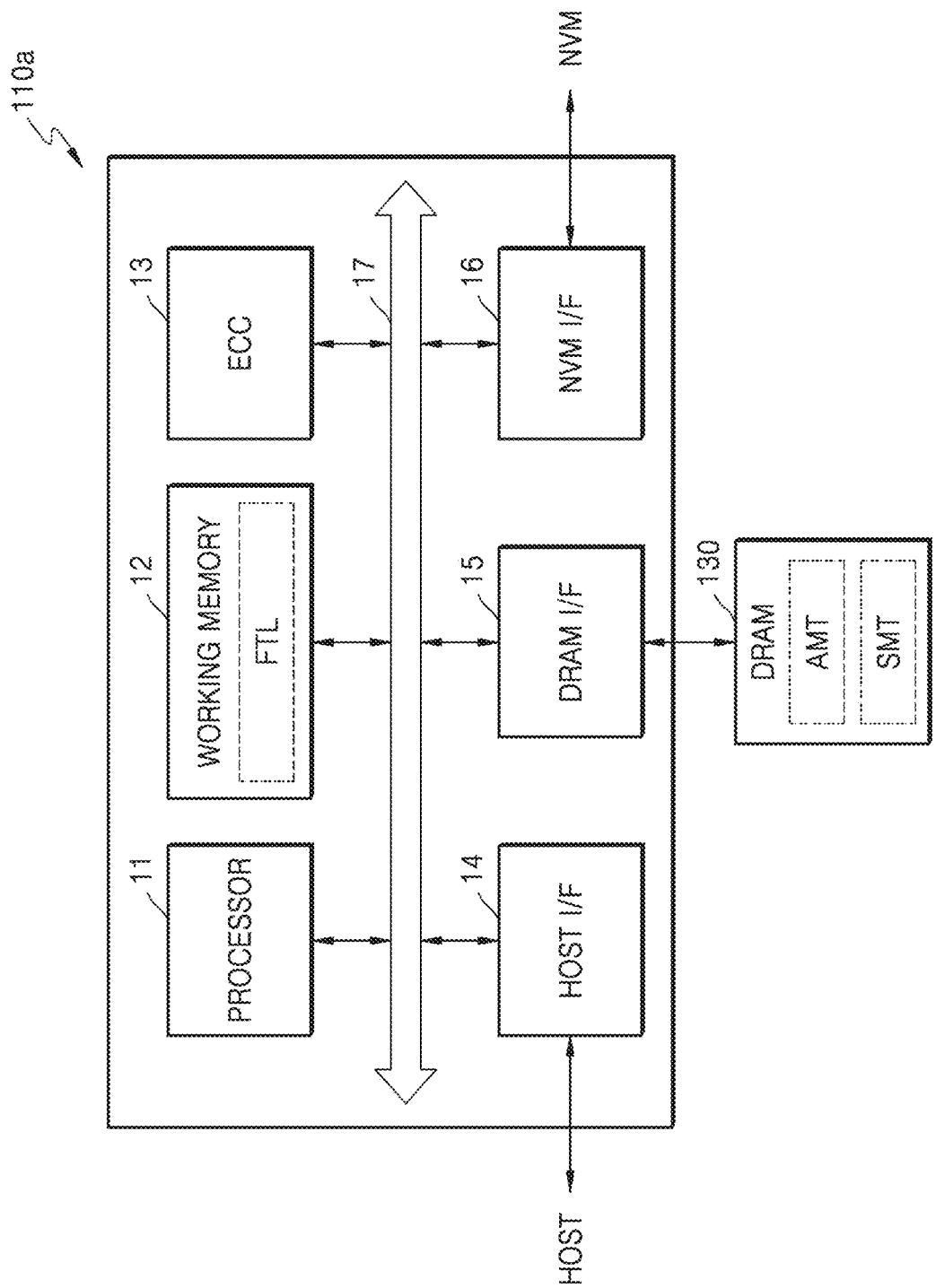
FIG. 6 is a block diagram illustrating a controller according to an example embodiment of the inventive concepts.

FIG. 6 is a block diagram illustrating a controller according to an example embodiment of the inventive concepts.

Referring to FIG. 6, a controller 110a may include a processor 11, a working memory 12, an error correction code (ECC) engine 13, a host interface 14, a DRAM interface 15, and a nonvolatile memory interface 16, which are capable of communicating with each other via a bus 17.

The processor 11 may include a central processing unit, a microprocessor, and the like and may control the overall operation of the controller 110a. In an example embodiment, processor 11 may be implemented as a multi-core processor, for example, a dual core processor or a quad core processor.

The working memory 12 may store firmware and data for controlling the controller 110a. The stored firmware and data may be processed by the processor 11. The working memory 12 may be implemented as a volatile memory such as DRAM or SRAM, or a nonvolatile memory such as PRAM or a flash memory.

The working memory 12 may store a flash translation layer (FTL). Since the write/read operation of the nonvolatile memory (120 in FIG. 1) is performed page-by-page and the erase operation is performed block-by-block, management of write, read and erase operations of the nonvolatile memory 120 may be performed. The FTL is system software (or firmware) for managing the write, read, and erase operations of the nonvolatile memory 120. The FTL may be loaded into the working memory 12 and operated by the processor 11.

For example, using the FTL, the processor 11 may manage an address mapping table AMT that matches the logical address provided by the host (200 in FIG. 1) and the physical address used in the nonvolatile memory 120. For example, the processor 11 may use the FTL to perform the functions of the mapping data management module (MDM of FIG. 1), and the mapping data management module MDM may manage the address mapping table AMT and the segment mapping table SMT. The address mapping table AMT and the segment mapping table SMT may be stored in the DRAM 130 outside the controller 110a. However, example embodiments of the inventive concepts are not limited to this example, and the working memory 12 may be used as a buffer memory, a cache memory, or the like. Further, the address mapping table AMT and the segment mapping table SMT may be stored in the working memory 12.

The ECC engine 13 may perform error correction encoding on data to be written to the nonvolatile memory 120 and may perform error correction decoding on data read from the nonvolatile memory 120. The ECC engine 13 may be configured to perform error correction by using coded modulation such as a low density parity check (LDPC) code, a BCH code, a turbo code, a Reed-Solomon code, a convolution code, a recursive systematic code (RSC), a trellis-coded modulation (TCM), or a block coded modulation (BCM), but the inventive concepts are not limited to these examples. On the other hand, when the segments of the address mapping table AMT are stored in the nonvolatile memory 120, the ECC engine 13 may perform error correction encoding on the segments. Therefore, the minimum unit of a segment may be set in units of ECC.

The host interface 14 may provide an interface between the host 200 and the controller 110a and may include an interface according to universal serial bus (USB), MMC, PCI-Express (PCI-E), AT attachment (ATA), serial AT attachment (SATA), parallel AT attachment (PATA), small computer system interface (SCSI), serial attached SCSI (SAS), enhanced small disk interface (ESDI), integrated drive electronics (IDE), or the like.

The DRAM interface 15 may provide an interface between the controller 110a and the DRAM 130. The DRAM 130 may temporarily store write data provided from the host 200 or data read from the nonvolatile memory 120 via the DRAM interface 15. When the data in the nonvolatile memory 120 is cached in the DRAM 130 at the time of the read request of the host 200, the DRAM 130 may support the cache function of directly provide the cached data to the host 200. At this time, the nonvolatile memory 120 is not accessed. Generally, the data transfer rate by the bus format (e.g., SATA or SAS) of the host 200 is much higher than that of the memory channel of the memory system 100. That is, when the interface speed of the host 200 is much higher, the DRAM 130 of a large capacity provides the buffering function, and thus, the performance degradation caused by the speed difference may be reduced (or, alternatively, minimized). The DRAM 130 may also store the address mapping table AMT and the segment mapping table SMT read out from the nonvolatile memory 120.

The nonvolatile memory interface 16 may provide an interface between the controller 110a and the nonvolatile memory 120. For example, data requested to be written or read from the host 200 may be transmitted and received between the controller 110 and the nonvolatile memory 120 via the nonvolatile memory interface 16. The address mapping table AMT and the segment mapping table SMT stored in the nonvolatile memory 120 may also be transmitted and received between the controller 110a and the nonvolatile memory 120 via the nonvolatile memory interface 16. In an example embodiment, the number of nonvolatile memory interfaces 16 corresponds to the number of nonvolatile memory chips constituting the nonvolatile memory 120 or the number of channels between the controller 110a and the nonvolatile memory 120.

Figure 7:
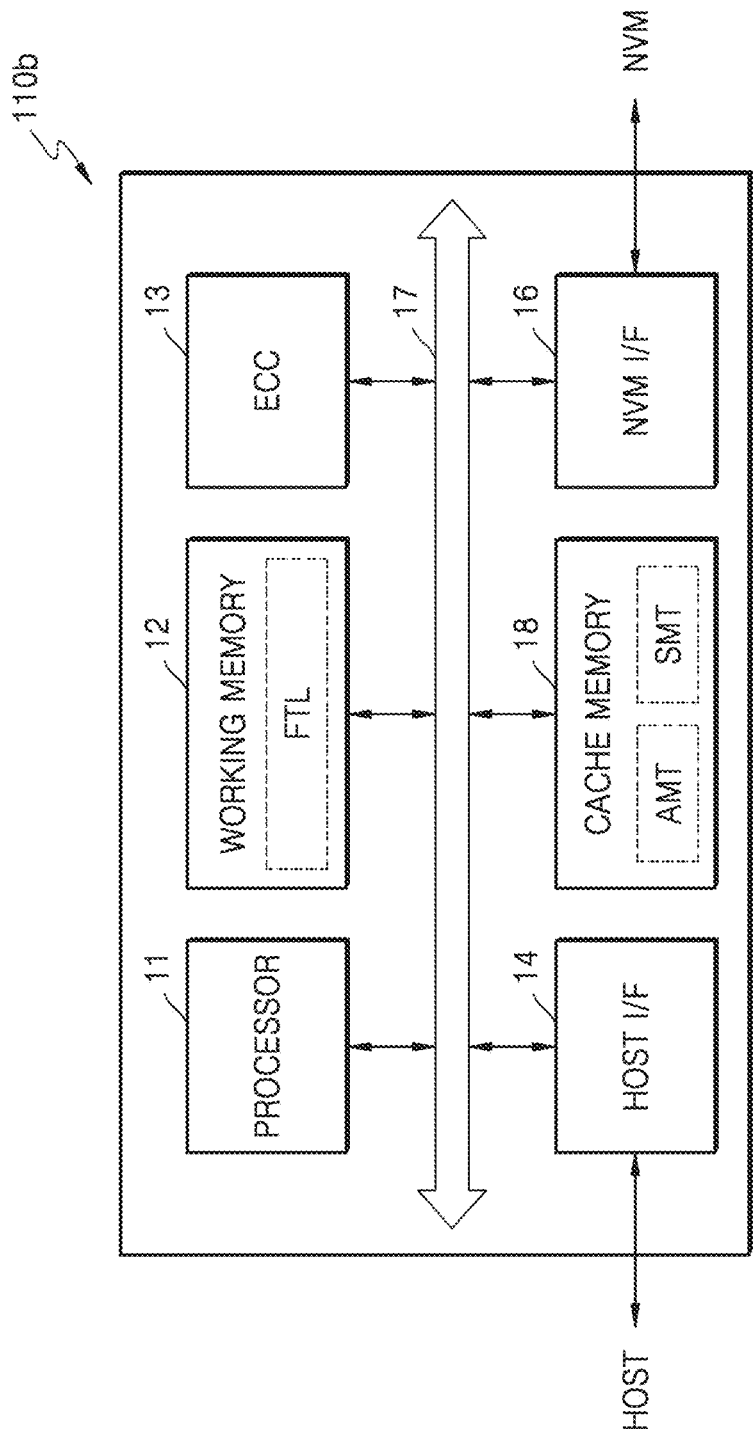
FIG. 7 is a block diagram illustrating a controller 110b according to an example embodiment of the inventive concepts.

FIG. 7 is a block diagram illustrating a controller 110b according to an example embodiment of the inventive concepts.

Referring to FIG. 7, the controller 110b may include the processor 11, the working memory 12, the ECC engine 13, the host interface 14, the nonvolatile memory interface 16, the cache memory 18, which are capable of communicating with each other via the bus 17.

The operations of the processor 11, the working memory 12, the ECC engine 13, the host interface 14, and the nonvolatile memory interface 16 are the same as those described with reference to FIG. 6, and thus the redundant description thereof is omitted here.

The cache memory 18 may support a cache function and may be implemented as a register, SRAM, DRAM, or the like. A part of the data stored in the nonvolatile memory (120 in FIG. 1) as the nonvolatile memory may be temporarily stored in the cache memory 18, and the address mapping table AMT and the segment mapping table SMT may be stored.

In an example embodiment, when the capacity of the cache memory 18 is insufficient to store all of the address mapping table AMT and the segment mapping table SMT, at least part of the address mapping table AMT (e.g., some of the plurality of segments of the address mapping table AMT), or at least part of each of the address mapping table AMT and the segment mapping table SMT may be stored (cached) in the cache memory 18. When the logical address provided from the host (200 in FIG. 1) is not included in the mapping entries included in the segments stored in the cache memory 18, the other segments included in the segment mapping table stored in the nonvolatile memory 120 may be read from the nonvolatile memory 120 and stored in the cache memory 18. At this time, since the capacity of the cache memory 18 is limited, some of the segments stored in the cache memory 18 may be flushed. As described above, the updated segments are grouped in page units, and the grouped segments may be stored in the nonvolatile memory 120.

Figure 8:
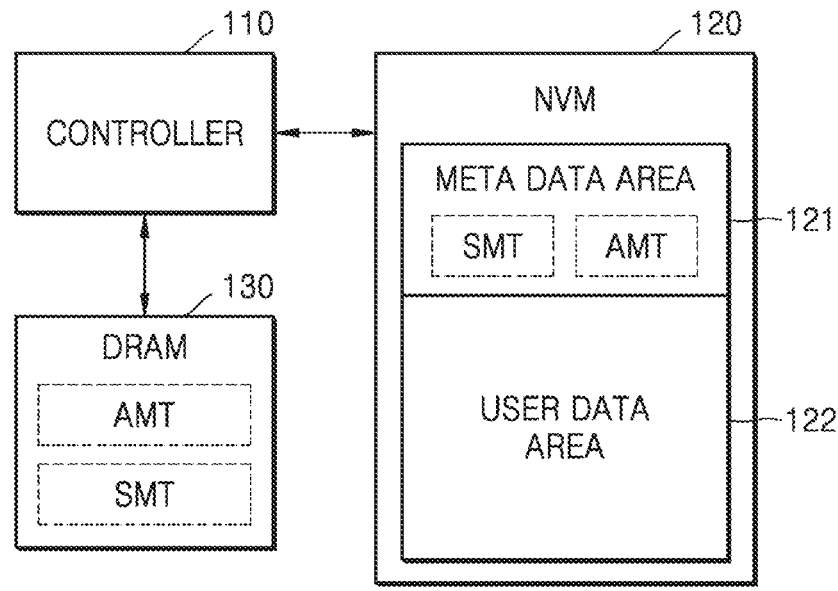
FIG. 8 is a diagram illustrating storage and loading of mapping tables in a memory system according to an example embodiment of the inventive concepts.

FIG. 8 is a diagram illustrating storage and loading of mapping tables in a memory system according to an example embodiment of the inventive concepts.

Referring to FIG. 8, the memory cell array of the nonvolatile memory 120 may include a metadata area 121 and a user data area 122. General data requested to be written from the host 200 may be stored in the user data area 122. Metadata for managing data stored in the user data area 122 may be stored in the metadata area 121. For example, the metadata may include mapping information between logical addresses and physical addresses, write and erase counts of each block, wear leveling information, and the like.

In an example embodiment, the address mapping table AMT and the segment mapping table SMT may be stored in the metadata area 121. When the memory system 100 is powered on, the controller 110 may read the segment mapping table SMT from the nonvolatile memory 120. The controller 110 may also read the address mapping table AMT from the nonvolatile memory 120. At this time, the controller 110 may read the address mapping table AMT by reading the segments from the nonvolatile memory 120 based on the segment mapping information included in the segment mapping table SMT. The segment mapping table SMT and the address mapping table AMT, which have been read, may be loaded into the DRAM 130. However, example embodiments of the inventive concepts are not limited to this example, and in an example embodiment, the segment mapping table SMT and the address mapping table AMT may be loaded into the memory in the controller 110.

Meanwhile, when at least one segment is updated in the address mapping table AMT loaded in the DRAM 130, the controller 110 may store at least one segment in the metadata area 121 of the nonvolatile memory 120. The controller 110 may group the updated at least two segments page-by-page and provide the grouped data to the nonvolatile memory 120, as described above. In addition, the controller 110 may store the updated segment mapping table SMT in the nonvolatile memory 120.

Figure 9:
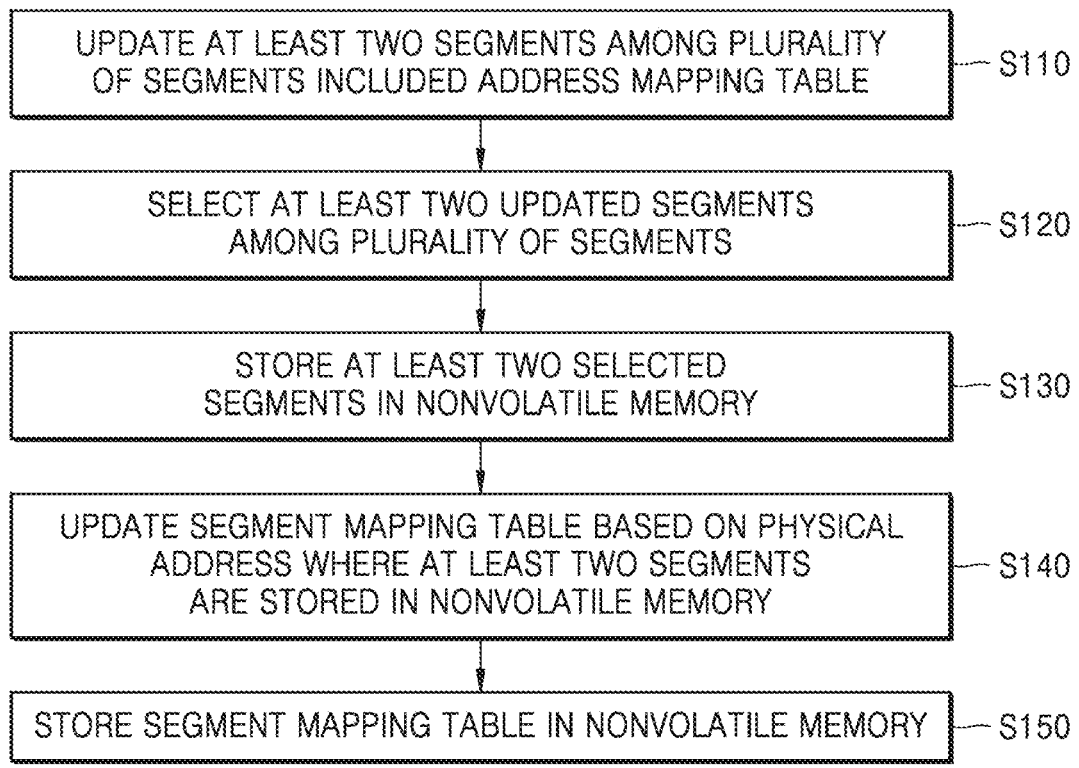
FIG. 9 is a flowchart illustrating a method of operation of a controller according to an example embodiment of the inventive concepts.

FIG. 9 is a flowchart illustrating a method of operation of a controller according to an example embodiment of the inventive concepts.

Referring to FIGS. 1 and 9, in operation S110, the controller 110 may update at least two segments among a plurality of segments included in the address mapping table. For example, the controller 110 may store data in the nonvolatile memory 120 in accordance with a write request (i.e., a write command and a logical address) from the host 200 and may update the mapping entry corresponding to the logical address, to thereby update segments including the mapping entry. In accordance with a plurality of write requests from the host 200, the controller 110 may update at least two segments.

In operation S120, the controller 110 may select at least two updated segments from among the plurality of segments. For example, the controller 110 may select the at least two segments as page data to be stored in one page of the nonvolatile memory 120. In an example embodiment, the controller 110 may select segments that include a relatively high number of updated mapping entries among the updated segments. In another example embodiment, the controller 110 may determine the importance of each of the segments and may select segments of relatively high importance among the updated segments.

In operation S130, the controller 110 may store the selected at least two segments in the nonvolatile memory 120. For example, the controller 110 may group the selected at least two segments to generate page data and provide the nonvolatile memory 120 with the page data and a physical address indicating the location where the page data is to be stored. The nonvolatile memory 120 may store the page data in the memory cell array MCA based on the physical address. The page data including at least two segments may be stored in the metadata area of the memory cell array MCA.

In operation S140, the controller 110 may update the segment mapping table based on the physical address in which the at least two segments are stored in the memory cell array MCA of the nonvolatile memory 120. For example, the controller 110 may manage the physical address for each of the plurality of segments included in the address mapping table AMT and may update the physical addresses corresponding to the two segments, based on the stored physical page numbers where the segments are stored and their offsets.

In operation S150, the controller 110 may store the segment mapping table SMT in the nonvolatile memory 120, periodically or upon occurrence of a specific event such as power-off of the memory system 100.

Figure 10:
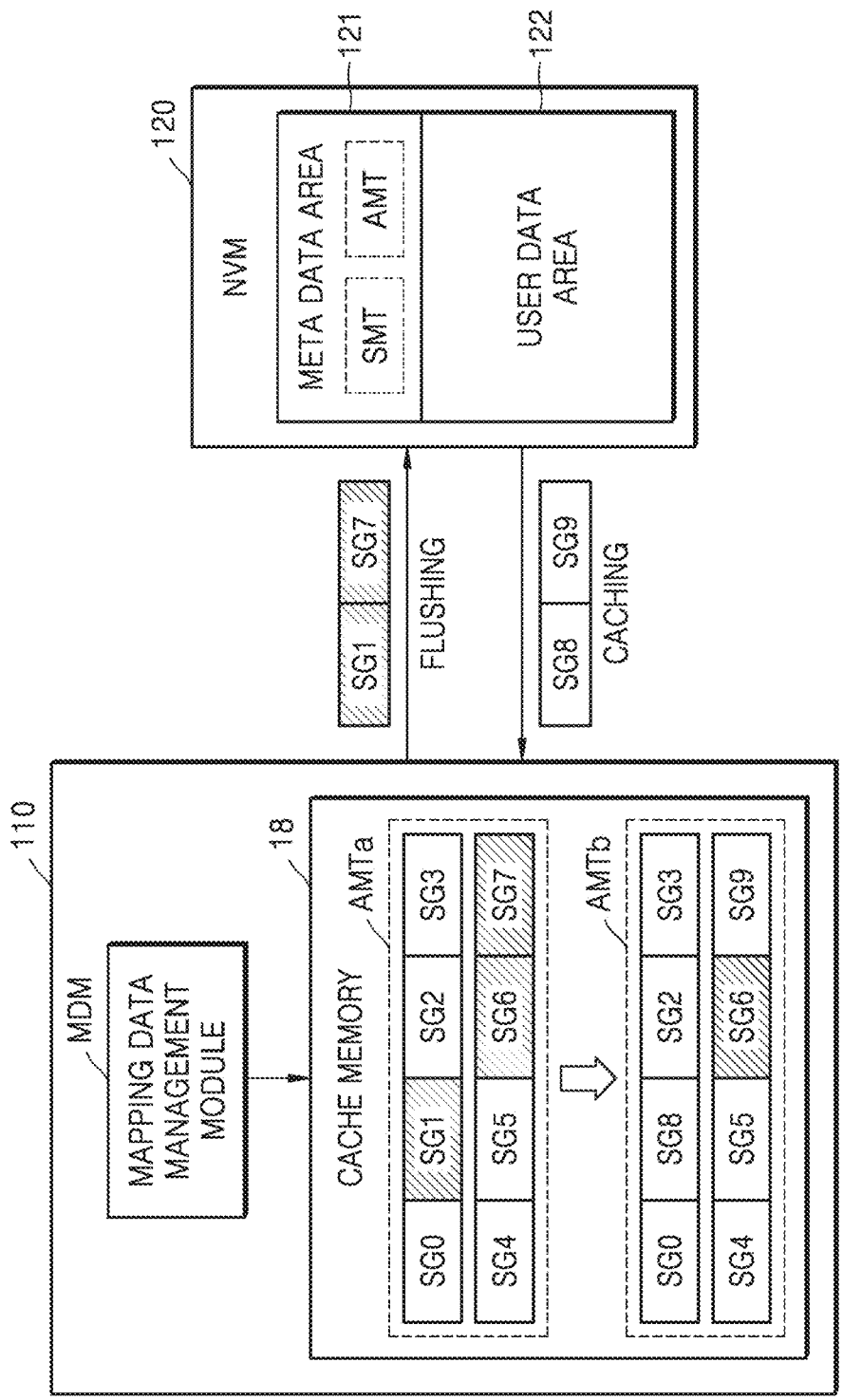
FIG. 10 is a diagram illustrating a method of operation of a controller according to an example embodiment of the inventive concepts.

FIG. 10 is a diagram illustrating a method of operation of a controller, according to an example embodiment of the inventive concepts.

Referring to FIG. 10, the controller 110 may include a cache memory 18, and part AMTa of the address mapping table AMT may be loaded (stored) into the cache memory 18. The capacity of the cache memory 18 may be relatively small to load the entire address mapping table AMT so that part AMTa of the address mapping table AMT stored in the nonvolatile memory 120 may be loaded into the cache memory 18. For example, the first to eighth segments SG0 to SG7 may be loaded into the cache memory 18. Also, although not shown, the segment mapping table SMT may be loaded into the cache memory 18.

In a state in which the second segment SG1, the seventh segment SG6, and the eighth segment SG7 of the first to eighth segments SG0 to SG7 are updated, when other segments are to be loaded into the cache memory 18, some of the updated segments may be flushed. That is, some of the updated segments may be stored in the nonvolatile memory 120.

The mapping data management module MDM may select some of the updated segments SG1, SG6, and SG7 and group the selected segments as page data. In an example embodiment, the mapping data management module MDM may select segments including a large number of relatively updated mapping entries, or relatively high importance segments. For example, the mapping data management module MDM may select the second segment SG1 and the eighth segment SG7, and the selected second segment SG1 and eighth segment SG7 may be grouped as page data. The second segment SG1 and the eighth segment SG7 may be provided to the nonvolatile memory 120, and the nonvolatile memory 120 may store the second segment SG1 and the eighth segment SG7 in one page of the metadata area 121.

On the other hand, among the plurality of segments included in the address mapping table AMT stored in the nonvolatile memory 120, other segments not loaded into the cache memory 18 may be loaded into the cache memory 18. For example, the ninth segment SG8 and the tenth segment SG9 may be cached in the cache memory 18. Accordingly, another part AMTb of the address mapping table AMT may be loaded into the cache memory 18.

Figure 11:
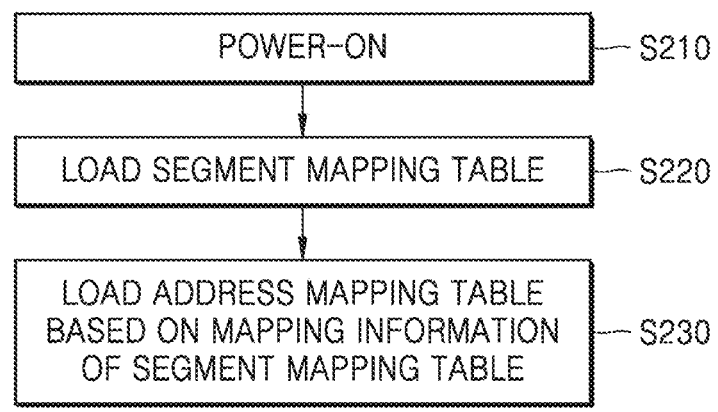
FIG. 11 is a flowchart illustrating a method of operation of a controller according to an example embodiment of the inventive concepts.

FIG. 11 is a flowchart illustrating a method of operation of a controller, according to an example embodiment of the inventive concepts. FIG. 11 shows a method of operation of the controller when the memory system is powered on.

Referring to FIGS. 1 and 11, in operation S210, the memory system 100 and the controller 110 may be powered on and the controller 110 may enter a setup stage according to the power-on.

In operation S220, the controller 110 may load the segment mapping table SMT. For example, the controller 110 may load the segment mapping table SMT stored in the nonvolatile memory 120 into a memory in the controller 110 or a buffer (for example, a DRAM) outside the controller 110.

In operation S230, the controller 110 may load the address mapping table AMT based on the segment mapping information of the segment mapping table SMT. The segment mapping table SMT includes the physical address of each of the segments included in the address mapping table AMT. Accordingly, the controller 110 may read the segments by accessing the area where each of the segments in the memory cell array MCA is stored based on the segment mapping information of the segment mapping table SMT. Accordingly, the segment mapping table SMT may be loaded into a memory in the controller 110 or a buffer (e.g., a DRAM) located outside the controller 110.

Figure 12:
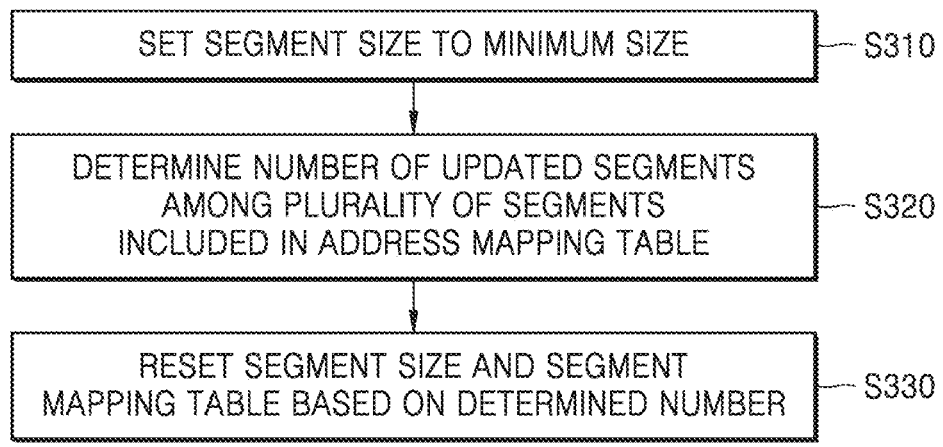
FIG. 12 is a flowchart illustrating a method of operation of a controller according to an example embodiment of the inventive concepts.

FIG. 12 is a flowchart illustrating a method of operation of a controller, according to an example embodiment of the inventive concepts. In this embodiment, the controller may change the segment size in the process of operation of the memory system.

Referring to FIGS. 1 and 12, In operation S310, the controller 110 may set the segment size (data size) to a minimum size. In an example embodiment, the minimum size may be an ECC unit, and the segment may include a plurality of mapping entries.

In operation S320, the controller 110 may determine the number of updated segments among a plurality of segments included in the address mapping table AMT. For example, the controller 110 may count the number of updated segments during the operation of the memory system 100.

In operation S330, the controller 110 may reset the segment size based on the determined number and reset the segment mapping table. For example, the logical address LA of the data that the host 200 requests to write may be concentrated in two specific segments, and accordingly, the controller 110 may determine that the two segments have been updated. The controller 110 may set the segment size to ½ of the page so that the two segments may be grouped as page data. A plurality of segments set to the minimum size may be reset to one segment. On the other hand, the segment mapping table includes physical addresses for each of the plurality of segments. As the plurality of segments are reset to one segment, the physical address for each of the plurality of segments may be merged and set as the physical address corresponding to the reset one segment.

Figure 13A:
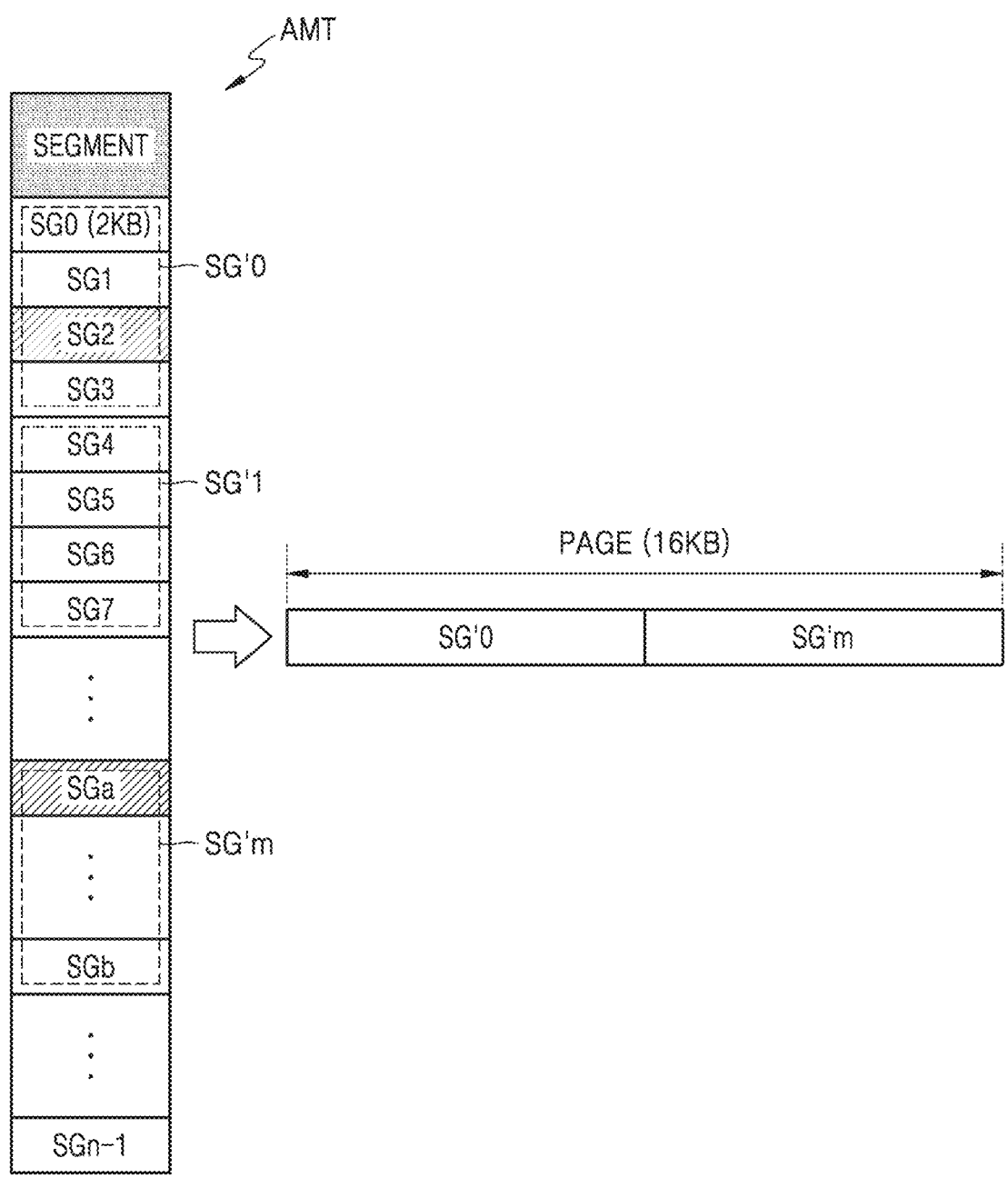
FIGS. 13A to 13C illustrate embodiments in which segments are resized, according to an example embodiment of the inventive concepts.
Figure 13B:
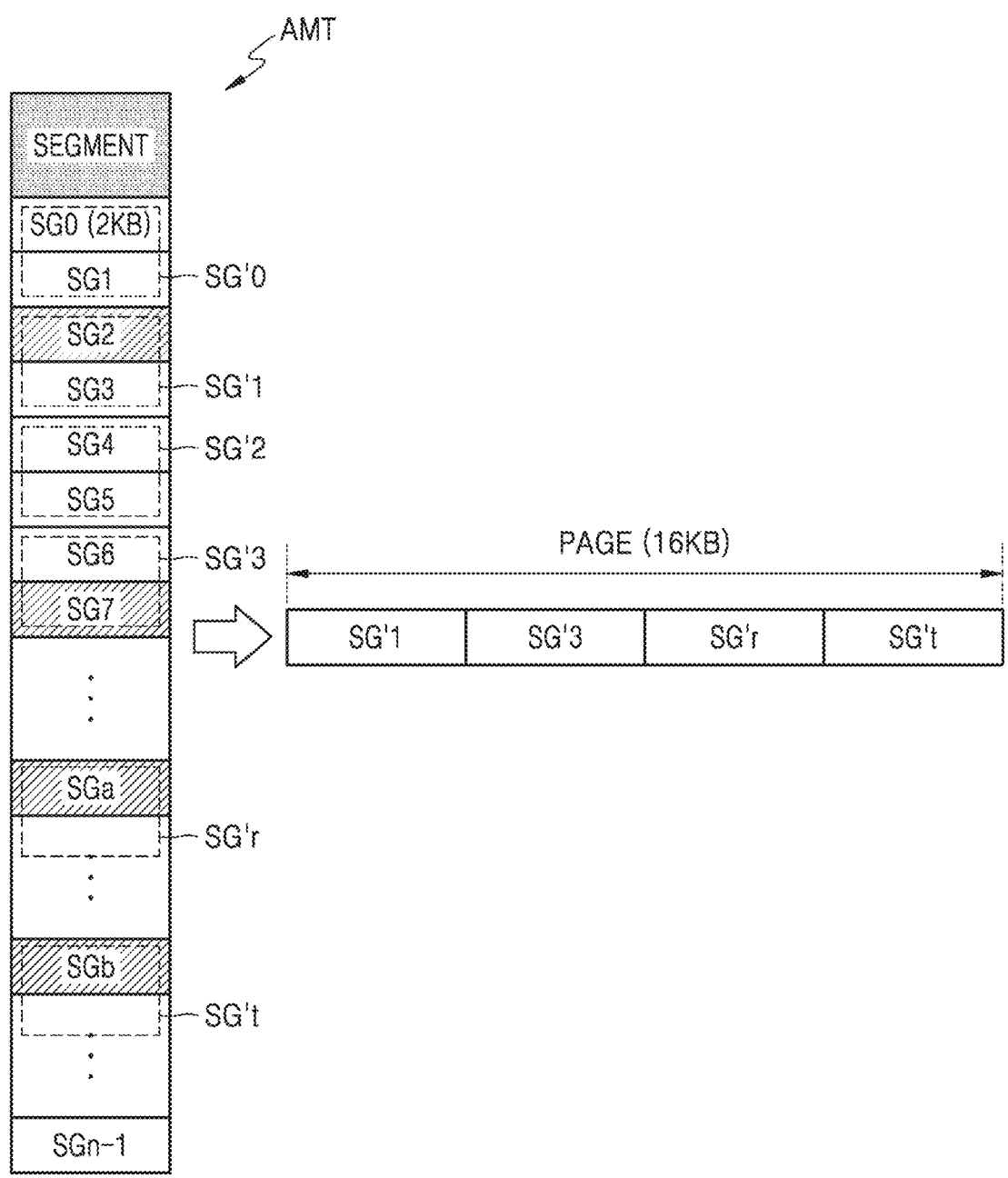
Figure 13C:
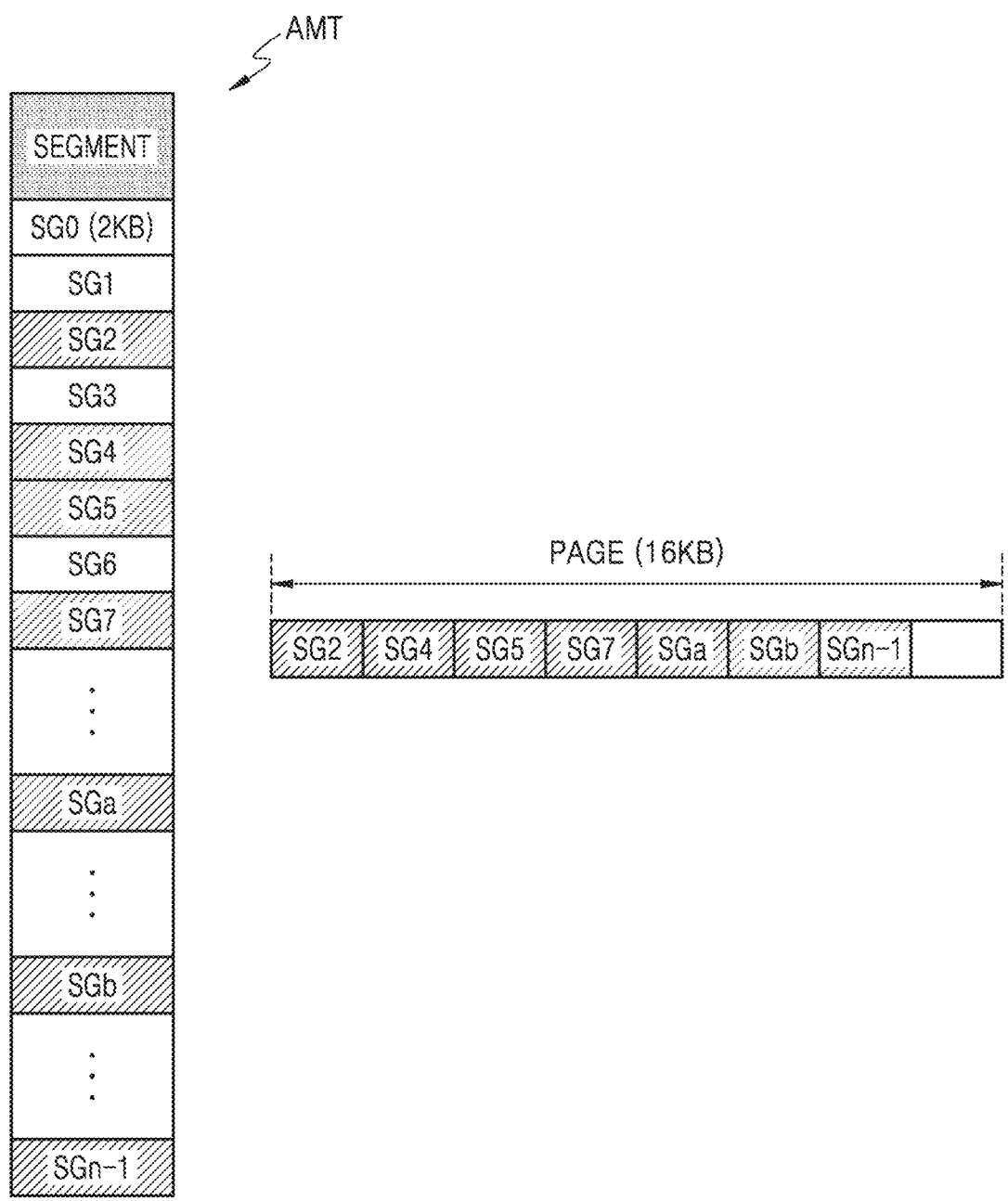

FIGS. 13A to 13C illustrate embodiments in which segments are resized, according to an example embodiment of the inventive concepts.

Referring to FIGS. 13A to 13C, the address mapping table AMT may include the plurality of segments SG0 to SGn−1, the segment size may be 2 KB, and the size of the write unit, i.e., the page, may be 16 KB.

Referring to FIG. 13A, two segments SG2 and SGa of the plurality of segments SG0 to SGn−1 may be updated. The controller (110 of FIG. 1) may store the updated two segments SG2 and SGa in the nonvolatile memory (120 in FIG. 1). At this time, the controller 110 may reset the segment size to 8 KB, and four of the plurality of segments SG0 to SGn−1 may be reset to one segment. For example, the first to fourth segments SG0 to SG3 may be reset to the first segment SG'0. The controller 110 may group the reset segments SG'0 and SG'm each including the updated segments SG2 and SGa as one page data and may store the page data in the nonvolatile memory 120.

Referring to FIG. 13B, four segments SG2, SG7, SGa, and SGb among the plurality of segments SG0 to SGn−1 may be updated. The controller (110 of FIG. 1) may store the updated four segments SG2, SG7, SGa, and SGb in the nonvolatile memory (120 in FIG. 1). At this time, the controller 110 may reset the segment size to 4 KB, and two of the plurality of segments SG0 to SGn−1 may be reset to one segment. For example, the first and second segments SG0 and SG1 may be reset to the first segment SG'0. The controller 110 may group the reset segments SG'1, SG'3, SG'r, and SG't including the updated segments SG2, SG7, SGa, and SGb, respectively, as one page data and may store page data in the nonvolatile memory 120.

Referring to FIG. 13C, seven segments SG2, SG4, SG5, SG7, SGa, SGb, and SGn−1 among the plurality of segments SG0 to SGn−1 may be updated. The controller (110 of FIG. 1) may store the updated seven segments SG2, SG4, SG5, SG7, SGa, SGb, and SGn−1 in the nonvolatile memory (120 in FIG. 1). The size of the seven segments is 14 KB. Therefore, resetting the segment size is not required. The controller 110 may group the seven segments SG2, SG4, SG5, SG7, SGa, SGb, and SGn−1 as one page data and store the page data in the nonvolatile memory 120.

As such, according to an example embodiment of the inventive concepts, the size of the segment may be variable in the process of operation of the memory system 100. On the other hand, as described above with reference to FIGS. 13A to 13C, as the segment size is reset, the physical address for each of the plurality of segments may be set as a physical address corresponding to one segment that has been merged and reset. The segment mapping table SMT may be reset to include the physical address for the reset segments.

Figure 14:
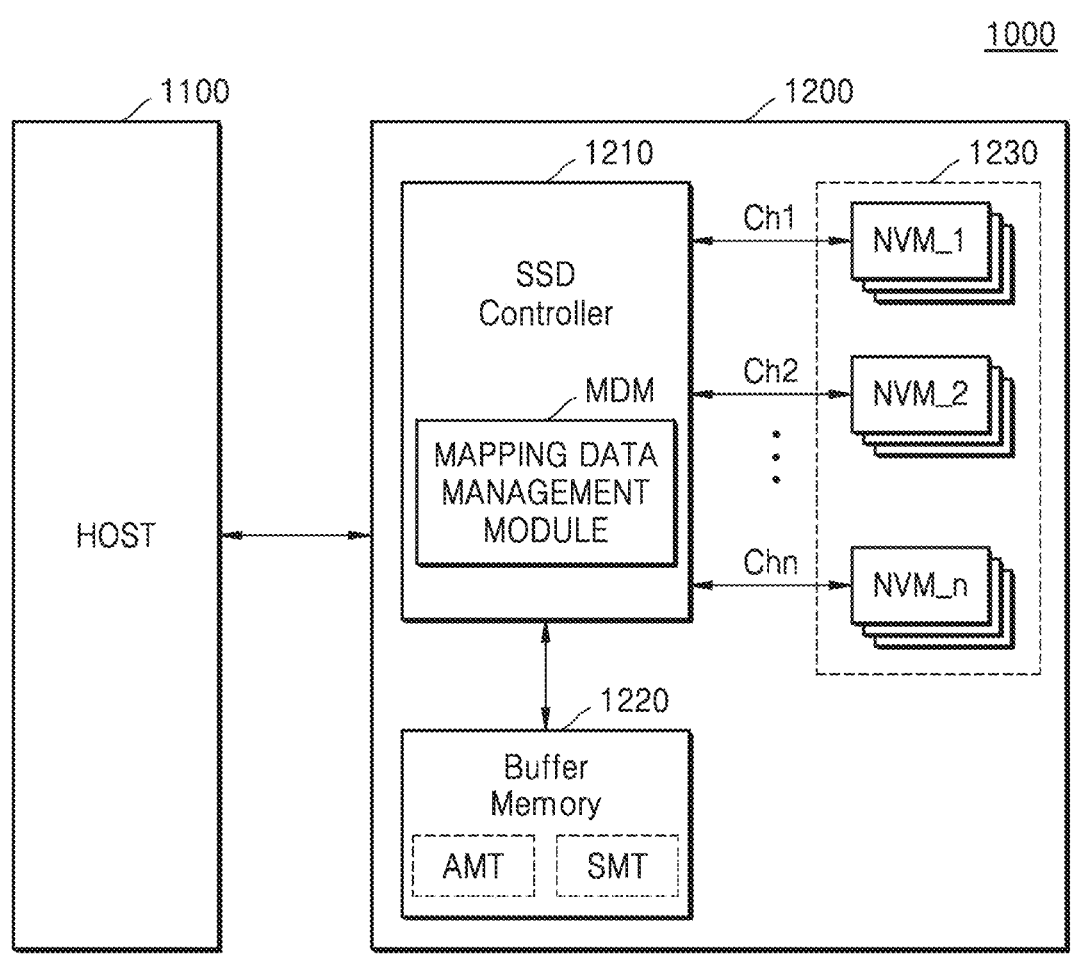
FIG. 14 is a block diagram illustrating an SSD according to an example embodiment of the inventive concepts.

FIG. 14 is a block diagram illustrating an SSD according to an example embodiment of the inventive concepts.

Referring to FIG. 14, an SSD system 1000 includes a host 1100 and an SSD 1200.

The SSD 1200 may include an SSD controller 1210, a buffer memory 1220, and nonvolatile memory devices 1230.

The SSD controller 1210 provides a physical connection between the host 1100 and the SSD 1200. The SSD controller 1210 provides an interface with the SSD 1200 in response to the bus format of the host 1100. In particular, the SSD controller 1210 decodes commands provided from the host 1100. Depending on the decoded result, the SSD controller 1210 accesses the nonvolatile memory devices 1230. Universal Serial Bus (USB), Small Computer System Interface (SCSI), PCI express, ATA, Parallel ATA (PATA), Serial ATA (SATA), Serial Attached SCSI (SAS), and the like may be used as the bus format of the host 1100.

In addition, the SSD controller 1210 may include a processor configured to perform the functions of the mapping data management module MDM and may manage the address mapping table AMT and the segment mapping table SMT as described with reference to FIGS. 1 to 13. When storing updated segments among a plurality of segments included in the address mapping table AMT loaded into the buffer memory 1220, in the nonvolatile memory device 1230, the SSD controller 1210 may select at least two updated segments, group the selected at least two segments as page data, and provide the nonvolatile memory device 1230 with the page data together with the physical address. The segment mapping table SMT may be updated based on the physical address provided to the nonvolatile memory device 1230 together with the SSD controller 1210 page data.

Write data provided from the host 1100 or data read from the nonvolatile memory devices 1230 are temporarily stored in the buffer memory 1220. When data in the nonvolatile memory devices 1230 is cached at the time of the read request of the host 1100, the buffer memory 1220 supports the cache function of directly providing the cached data to the host 1100. In general, the data transfer rate by the host 1100 in the bus format (e.g., SATA or SAS) is much higher than the transfer rate of the memory channel of the SSD 1200. That is, when the interface speed of the host 1100 is much higher, the performance degradation caused by the speed difference may be reduced (or, alternatively, minimized) by providing the buffer memory 1220 of a large capacity.

The buffer memory 1220 may also store the address mapping table AMT and the segment mapping table SMT.

The nonvolatile memory devices 1230 are provided as a storage medium of the SSD 1200. For example, the nonvolatile memory devices 1230 may be provided as a NAND-type flash memory having a large storage capacity. The nonvolatile memory devices 1230 are coupled to the SSD controller 1210 through a plurality of channels. Although the nonvolatile memory devices 1230 as a storage medium have been described by way of example of NAND flash memory, they may also be configured with other nonvolatile memory devices. For example, PRAM, MRAM, ReRAM, FRAM, NOR flash memory, or the like may be used as a storage medium, and a memory system in which heterogeneous memory devices are combined may also be applied. In addition, a volatile memory device (e.g., DRAM) may be included as a storage medium.

As described above, example embodiments have been disclosed in the drawings and specification. While example embodiments have been described herein with reference to specific terms, it should be understood that they have been used only for the purpose of describing the technical idea of the inventive concepts and not for limiting the scope of the inventive concepts as defined in the claims. Therefore, those skilled in the art will appreciate that various modifications and equivalent embodiments are possible without departing from the scope of the inventive concepts. Accordingly, the true scope of protection of example embodiments of the inventive concepts should be determined based on the appended claims.

What is claimed is:

1. A memory controller comprising:
a memory configured to store an address mapping table and a segment mapping table, the address mapping table including a plurality of segments, each of the plurality of segments including a plurality of mapping entries representing mapping information between logical addresses and physical addresses, and the segment mapping table including physical addresses representing areas in which each of a plurality of segments are stored in a nonvolatile memory; and
processing circuitry configured to,
update the address mapping table in response to instructing the nonvolatile memory to store data such that at least two of segments among the plurality of segments are updated,
select the at least two of the updated segments among the plurality of segments included in the address mapping table as one page of data,
instruct the nonvolatile memory to store the data including the at least two of the updated segments at the physical addresses associated with the one page, and
update the segment mapping table based on the physical addresses associated with the one page such that, in the segment mapping table, the at least two of the updated segments are indicated as stored at the physical addresses for a same page of the nonvolatile memory.

2. The memory controller of claim 1, wherein each of the physical addresses includes a physical page number and an offset, the offset indicating an arrangement amongst the plurality of segments in the one page.

3. The memory controller of claim 1, wherein the processing circuitry is configured to determine the at least two of the updated segments based on a number of updated mapping entries associated with different ones of the plurality of segments.

4. The memory controller of claim 1, wherein the processing circuitry is configured to determine the at least two of the updated segments based on a priority of the plurality of segments.

5. The memory controller of claim 1, wherein a data size of each of the plurality of segments is variable and is smaller than that of the one page.

6. The memory controller of claim 1, wherein a minimum data size of each of the plurality of segments is equal to a unit size at which error correction is performed.

7. The memory controller of claim 1, wherein the nonvolatile memory includes a metadata area and a user data area, the metadata area configured to store metadata and the user data area configured to store data provided from a host, and wherein the memory controller is configured to store the address mapping table and the segment mapping table in the metadata area of the nonvolatile memory.

8. The memory controller of claim 7, wherein the memory controller is configured to, load the segment mapping table from the nonvolatile memory into the memory of the memory controller at a power-on setting stage, and load the address mapping table from in the nonvolatile memory into the memory of the memory controller based on the mapping information in the segment mapping table.

9. The memory controller of claim 7, wherein the nonvolatile memory includes NAND flash memory cells.

10. A method of operating of a memory controller, the method comprising:

updating an address mapping table in response to instructing a nonvolatile memory to store data such that at least two of segments among a plurality of segments included in the address mapping table are updated, each of the plurality of segments including a plurality of mapping entries representing mapping information between logical addresses and physical addresses;

selecting the at least two of the updated segments among the plurality of segments included in the address mapping table as one page of data; and instructing a nonvolatile memory to store the one page of data including the at least two of the updated segments at a physical address associated with the one page of the data; and updating a segment mapping table based on the physical addresses associated with the one page such that, in the segment mapping table, the at least two of the updated segments are indicated as stored at the physical address for a same page of the nonvolatile memory.

11. The method of claim 10, wherein the segment mapping table includes mapping information indicating a location where each of the plurality of segments are stored in the nonvolatile memory based on the physical address.

12. The method of claim 10, wherein each of the plurality of segments includes a plurality of mapping entries, the plurality of mapping entries indicating mapping information between logical addresses and physical addresses, each of the plurality of segments having a data size that is smaller than a write unit of the nonvolatile memory.

13. The method of claim 10, wherein the selecting the at least two of the updated segments comprises:

determining a number of updated mapping entries associated with each of the plurality of segments.

14. The method of claim 10, further comprising:

determining a number of the at least two of the updated segments among the plurality of segments; and changing a size of each of the segments based on the number of the at least two of the updated segments.

15. A storage device comprising:

a nonvolatile memory;

a buffer memory configured to store an address mapping table and a segment mapping table, the address mapping table including a plurality of segments, each of the plurality of segments including a plurality of mapping entries representing mapping information between logical addresses and physical addresses, and the segment mapping table including physical addresses representing areas in which each of a plurality of segments are stored in the nonvolatile memory; and a memory controller configured to, update the address mapping table in response to instructing the nonvolatile memory to store data such that at least two of segments among the plurality of segments are updated, select at least two of the updated segments among the plurality of segments included in the address mapping table as one page of data, instruct the nonvolatile memory to store the data including the at least two of the updated segments at the physical addresses associated with the one page, and update the segment mapping table based on the physical addresses associated with the one page such that, in the segment mapping table, the at least two of the updated segments are indicated as stored at the physical addresses for a same page of the nonvolatile memory.

16. The storage device of claim 15, wherein the memory controller is configured to determine the at least two of the updated segments based on a number of updated mapping entries associated with different ones the plurality of segments.

17. The storage device of claim 15, wherein the memory controller is configured to store the address mapping table and the segment mapping table in a metadata area of the nonvolatile memory.

18. The storage device of claim 17, wherein the memory controller is configured to, load the segment mapping table from the nonvolatile memory into the buffer memory at a power-on setting stage, and load the address mapping table from the nonvolatile memory into the buffer memory based on mapping information of the segment mapping table.

* * * * *